US006662987B2

(12) United States Patent
Erni

(10) Patent No.: US 6,662,987 B2
(45) Date of Patent: Dec. 16, 2003

(54) CABLE PROCESSING EQUIPMENT WITH CABLE CHANGER

(75) Inventor: Benedikt Erni, Sempach Station (CH)

(73) Assignee: Komax Holding AG, Dierikon (CH)

( * ) Notice: Subject to any disclaimer, the term of this patent is extended or adjusted under 35 U.S.C. 154(b) by 53 days.

(21) Appl. No.: 10/013,065

(22) Filed: Dec. 6, 2001

(65) Prior Publication Data

US 2002/0069519 A1 Jun. 13, 2002

(30) Foreign Application Priority Data

Dec. 8, 2000 (EP) ........................................... 00811165

(51) Int. Cl.[7] ........................ B65H 20/24; B65H 20/00; B23P 19/00

(52) U.S. Cl. ....................... 226/110; 226/128; 226/143; 226/172; 29/741; 140/147

(58) Field of Search ................................ 226/102, 109, 226/110, 143, 172; 29/741; 140/147; 188/65.3, 65.4

(56) References Cited

U.S. PATENT DOCUMENTS 3,612,369 A * 10/1971 Grebe et al. .................. 226/24
3,909,900 A * 10/1975 Gudmestad ................ 29/564.4
4,182,473 A * 1/1980 Mikulas ...................... 226/143
4,469,267 A * 9/1984 Franchuk et al. ........... 226/172
4,932,110 A 6/1990 Tanaka
5,611,141 A * 3/1997 Takada et al. ................ 29/861
5,752,642 A * 5/1998 Bucher ....................... 226/155
5,913,469 A * 6/1999 Suzuki ........................ 226/36
6,041,991 A * 3/2000 Mehri et al. ................ 226/177
6,135,164 A 10/2000 Celoudoux et al.
6,186,440 B1 * 2/2001 Yamakawa et al. ...... 242/615.3

FOREIGN PATENT DOCUMENTS

EP 0736 928 A2 10/1996
EP 0915 538 A2 5/1999

* cited by examiner

*Primary Examiner*—Michael R. Mansen
(74) *Attorney, Agent, or Firm*—Schweitzer Cornman Gross & Bondell LLP

(57) ABSTRACT

In a cable processing equipment a cable changer stands perpendicularly relative to a base plate, at which a straightening unit and a cable transport unit are arranged. The cable changer is movable upwardly or downwardly and consists of a frame with horizontal frame members and vertical frame members. Cable guides are arranged at the vertical frame members. Cable guides which are at the inlet side as seen in cable transport direction are provided with clamping/retracting units, and cable guides at the outlet side are provided with clamping units. The clamping/retracting units at the inlet side are switchable by means of a first actuating device arranged at the base plate. The clamping units at the outlet side are switchable by means of a second actuating device arranged at the base plate. Cables which are not at the moment transported in the cable transport direction, are clamped by the clamping/retracting units and the clamping units.

4 Claims, 3 Drawing Sheets

Fig. 2
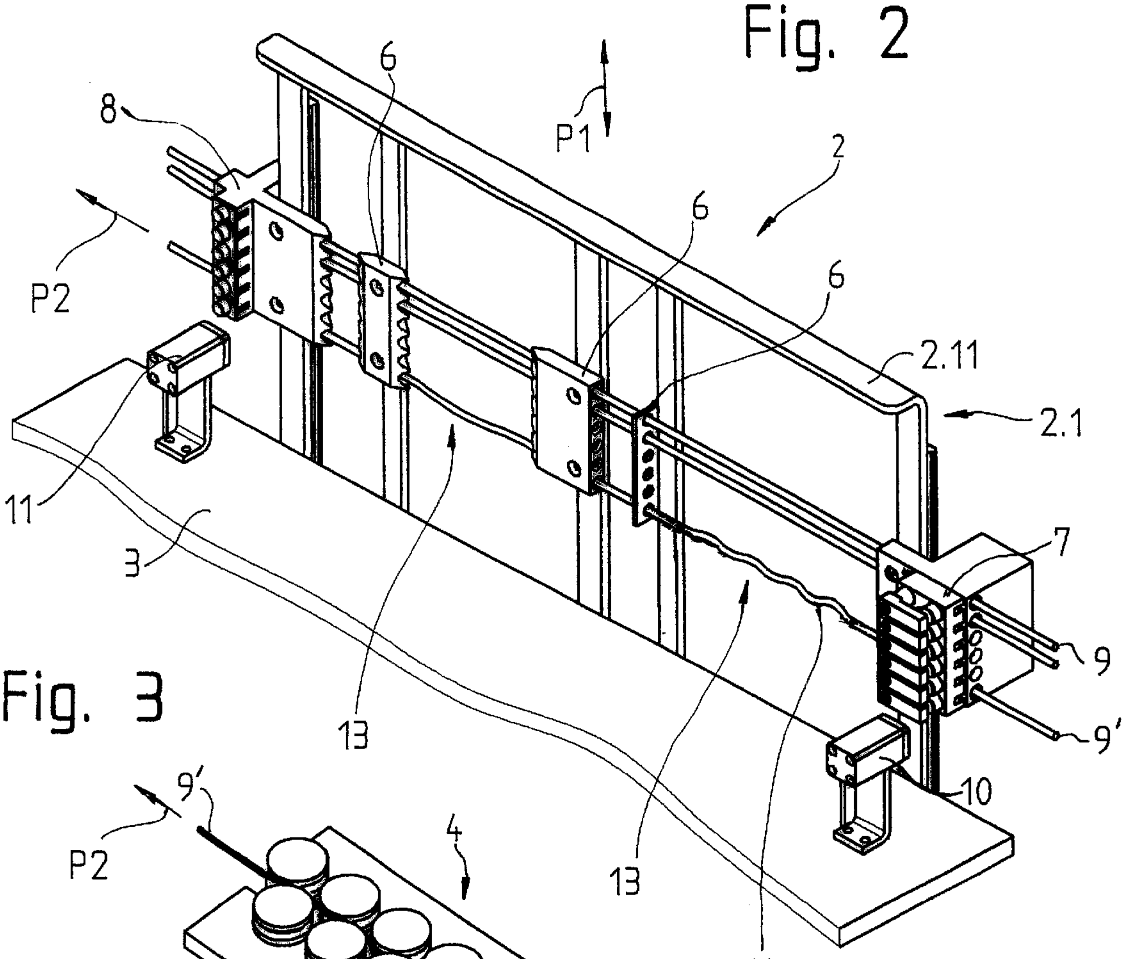
Fig. 3
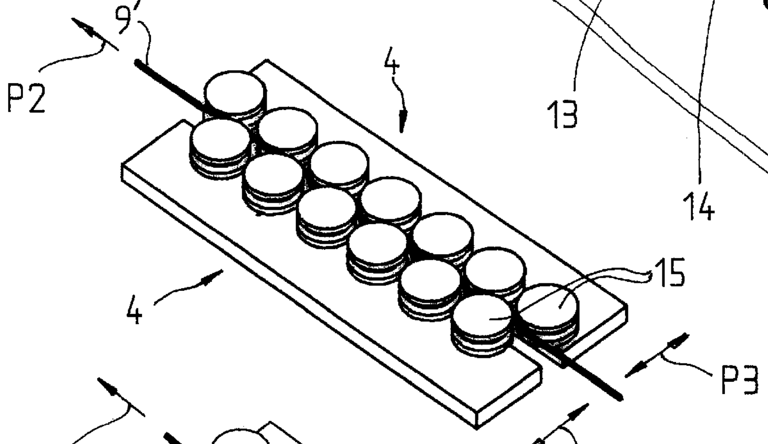
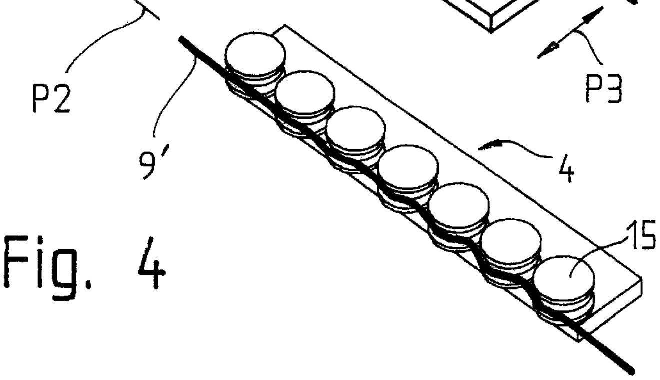
Fig. 4

CABLE PROCESSING EQUIPMENT WITH CABLE CHANGER

The invention relates to cable processing equipment with a cable changer for holding several cables, wherein the cable to be processed is selectable from the cables of the cable changer and can be fed to the processing unit.

BACKGROUND OF THE INVENTION

There has become known from application specification EP 0 915 538 A2 a cable processing machine with a cable straightening station, a transport station, a cable retracting station and a cable changer. The cable straightening station, the transport station and the cable retracting station are arranged in succession in the cable transport direction. Cables deviating from a straight line or from the cable longitudinal axis, for example with curves, bends, kinks or the like, are straightened by means of the cable straightening station, so that the cables after running through the straightening stations no longer have any deviations perpendicular to the longitudinal axis. The transport station draws the cable through the cable straightening station and pushes the straightened cable to the cable retracting station and further to a cable nozzle at the outlet side. The cable changer serves as a cable feed device and consists of a frame displaceable in the vertical direction. The horizontally guided cables are held in a vertical plane at a specific spacing one above the other and are guided in tubularly constructed spring strips forming guide paths. For changing a cable the frame is moved up and down until the desired cable lies along the processing axis. The cable retracting station, consisting of at least one clamping device and a curve forming device, is activated beforehand, wherein the free end of the cable is drawn back into the cable nozzle. With the deactivation of the cable retracting station, the cable is pushed out of the cable nozzle by a specific overhang.

A disadvantage of the known equipment is that, with the tubularly constructed spring strips forming the guide paths, a specific spacing of the cables held one above the other is preset. Only a specific number of cables can be held per meter of frame height. In the case of a larger number of cables to be held, the frame of the cable changer is correspondingly awkward. Moreover, the overhang of the cable has a disadvantageous effect on the centering of the cable after opening of the straightening apparatus.

BRIEF DESCRIPTION OF THE INVENTION

The present invention meets the object of avoiding the disadvantages of the known equipment and of providing cable processing equipment with a cable changer by means of which a cable change can be undertaken free of disturbance. In accordance with the invention a cable processing equipment has a cable changer, a cable transport device to select a cable to be processed, and a clamping device for each cable. The clamping device may comprise a clamping/retracting unit at the inlet side of the cable changer and a clamping unit at the outlet side. The clamping/retracting unit may be formed with the combination of a retraction cylinder and a clamping cylinder actuable against a spring force.

The advantages achieved by the invention are essentially to be seen in that the cables can be arranged more densely one above the other in the cable changer and thus the number of cables per meter of frame height can be substantially increased. In the case of a frame constructed to be less high, less mass has to be moved, which in turn makes possible shorter times in cable changing.

Moreover, the pick-up region of the rollers of the straightening unit can be reduced. The valley depth of the rollers is smaller, which in turn has a favorable effect on the roller spacing. Cable jams, caused by loose cable or cable loops which are pushed against the cable guide following in cable transport direction, do not arise in the region of the cable transport unit.

In addition, it is advantageous that the free cable ends after a cable change do not have to be cut again, because the free cable ends are firmly held. The free cable ends are also precisely positioned after a vertical movement of the cable changer for the take-over for further processing.

BRIEF DESCRIPTION OF THE DRAWINGS

The present invention is explained in more detail by reference to the accompanying figures, wherein:

FIG. 2 shows the cable changer with a loose cable;

FIG. 3 shows a straightening path for the cable formed from straightening rollers;

FIG. 4 shows a straightening process in the straightening path;

DETAILED DESCRIPTION OF THE INVENTION

Figure 1:
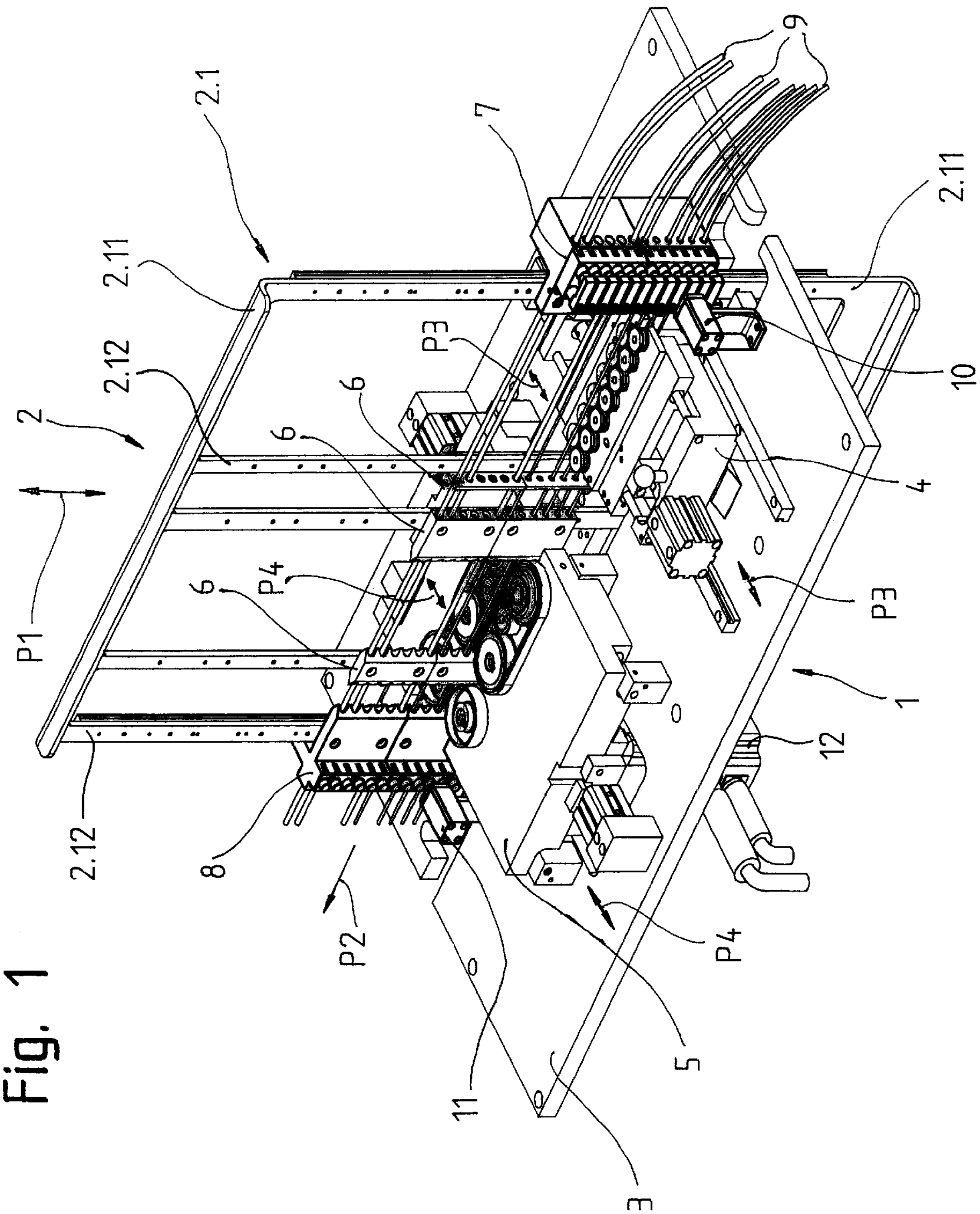
FIG. 1 shows a cable processing equipment of the invention with a cable changer.

FIG. 1 shows cable processing equipment 1 with a cable changer 2. The cable changer 2 stands vertically relative to a base plate 3, at which a straightening unit 4 and a cable transport unit 5 are arranged. A cable cutting device at the outlet side is not illustrated. The cable changer 2 is movable upwardly and downwardly in the directions shown by an arrow P1 and consists of a frame 2.1 with horizontal frame members 2.11 and vertical frame members 2.12. A drive for the upward/downward movement of the frame 2.1 is not illustrated. Cable guides 6 are arranged at the vertical frame members 2.12, wherein further cable guides which are at the inlet side with respect to the cable transport direction P2 are provided with clamping/retracting units 7, and cable guides at the outlet side are provided with clamping units 8. The cable guides are, for example, installable in blocks or sets of six upon the vertical frame members 2.12 and serve for holding, guiding, clamping and retracting the individual cables denoted by 9. The cables 9 fed at the inlet side are disposed, for example, on spools or in drums. The clamping/retracting units 7 at the inlet side are switchable by means of a first actuating device 10, for example a pneumatic cylinder, arranged at the base plate 3. The clamping units 8 at the outlet side are switchable by means of a second actuating device 11, for example a pneumatic cylinder, arranged at the base plate 3. The construction and mode of function of the clamping/retracting units 7 and the clamping units 8 are explained further below.

Actuating devices 10, 11, clamping/retracting unit 7 and clamping unit 8 form a clamping device for clamping a cable 9 in the cable changer 2, at which time the cable is not transported in cable transport direction P2.

The cables 9 arranged one above the other in the cable changer 2 can have different cross-sections, colors, insulations, conduction properties, etc. According to the respective cable to be processed the frame 2.1 is moved up or down until the individual desired cable 9 lies at the height of the straightening unit 4 and the cable transport unit 5.

Before further processing, the selected cable 9 runs through a straightening path through the straightening unit 4. A Cable 9 deviating from the cable longitudinal axis, for example with curves, bends, kinks or the like, is straightened by means of the straightening unit 4, wherein a unit of straightening rollers 15 is provided for each side of the particular cable 9 to be processed. Each roller unit is movable in the directions shown by arrow P3. During the straightening process the straightening path is closed, wherein the straightening rollers 15 form the straightening path. During the upward/downward movement of the cable changer 2 the straightening path is open, wherein the straightening units are relieved or retracted.

The individual cable 9 intended for straightening is moved in the cable transport direction P2 by a respective portion of cable transport unit 5 provided at each side of the cable 9. Each portion of cable transport unit 5 is movable in the direction shown by an arrow P4. During the transport process the transport path is closed, wherein the transport path is formed by means of belts on each of the portions of the cable transport unit driven by a belt drive 12. During the upward/downward movement of the cable changer 2 the transport path is open, wherein the transport units are relieved or retracted.

FIG. 2 shows the cable changer 2 with a loose cable 9'. Thin cables 9, in particular, after the opening of the straightening path or the transport path may have a sag 13 in the straightening path region or in the transport path region. Moreover, the cable 9' has in the straightening path region a slight wave shape 14 departing from the straightening path. Cables 9 with a sag 13 and/or waves 14 makes closing of the straightening path or the transport path difficult or impossible, particularly in the case of cables 9 arranged closely one above the other.

FIG. 3 shows a straightening path formed from straightening rollers 15. The straightening rollers 15 of the respective portions of straightening unit 4 arranged on each side of the cable 9' constrain the cable 9' into a wave-shaped course through the straightening path. As is evident from FIG. 4, the straightening rollers 15 are so arranged that the cable 9' is strongly deflected at the inlet side and decreasingly deflected in the cable transport direction P2. The thinner the cable 9' to be straightened, the more straightening rollers 15 are necessary.

Figure 5:
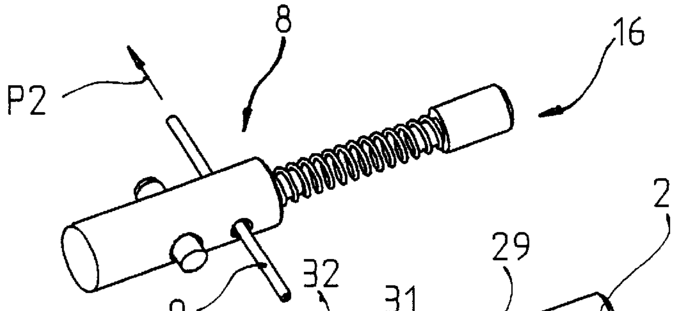
FIG. 5 shows details of a clamping unit at the outlet side of the equipment.

FIG. 5 shows details of the clamping unit 8 at the outlet side for fixing the cable 9 ahead of a cable cutting unit, which is not illustrated. The clamping unit 8 consists of a housing, which is not illustrated, for guiding the cable 9 and a clamping element 16, which is arranged in the housing, for fixing the cable 9, wherein the clamping element 16 can be activated by means of the second actuating device 11. Construction and function of the clamping element 16 correspond to that of the clamping element of the clamping/retracting unit 7 which is explained in FIGS. 6–8. A clamping unit 8 and a clamping/retracting unit 7 is provided for each cable 9.

Figure 6:
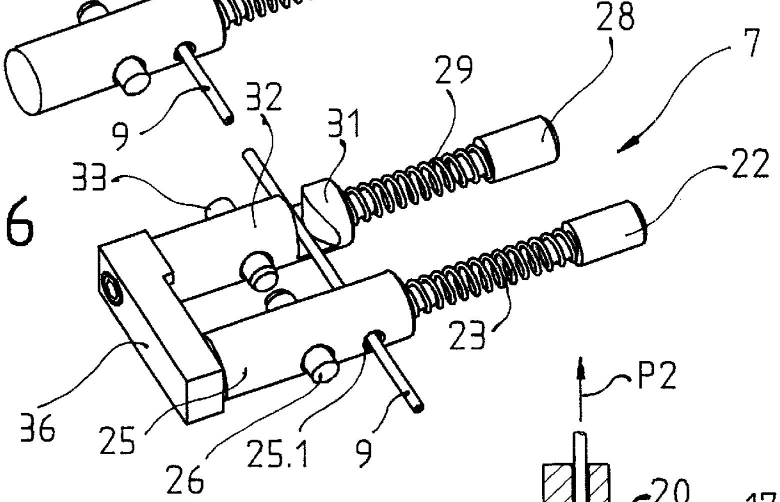
FIG. 6 shows details of a clamping/retracting unit at the inlet side of the equipment.
Figure 7:
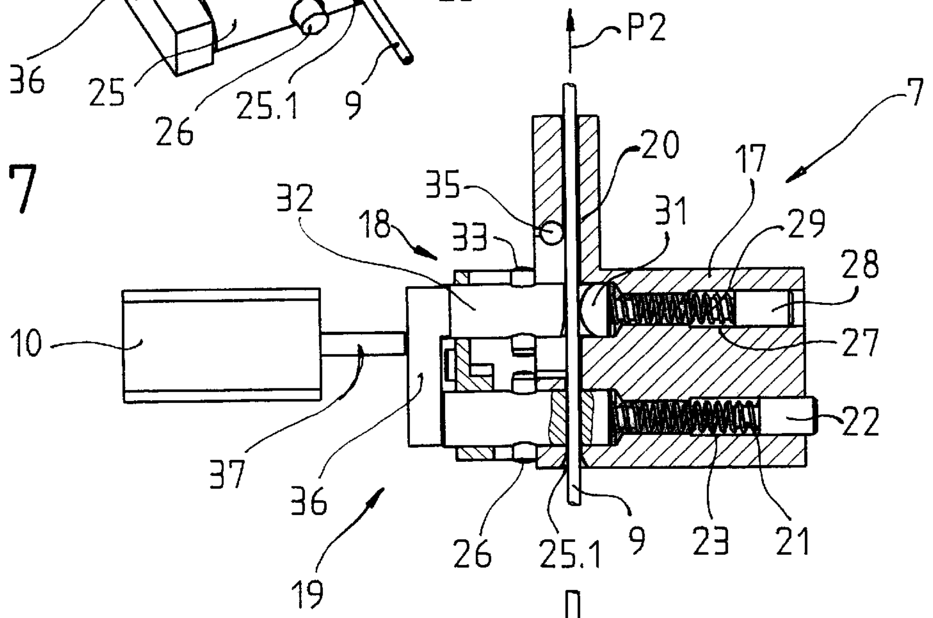
FIG. 7 shows the clamping/retracting unit in the position for cable transport.
Figure 8:
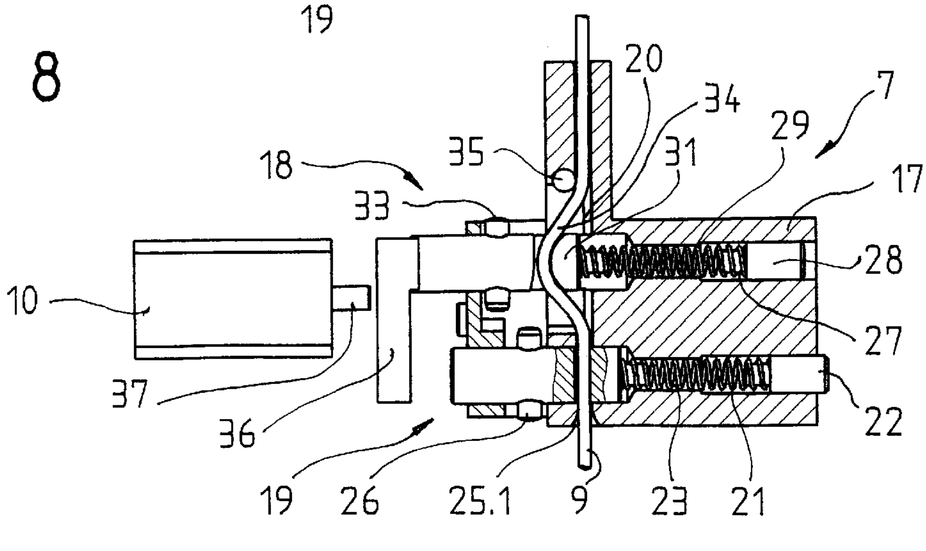
FIG. 8 shows the clamping/retracting unit in the position for cable retraction.

FIGS. 6 to 8 show details of the clamping/retracting unit 7 at the inlet side for the fixing and retraction of the cable 9, wherein FIG. 7 illustrates the clamping/retracting unit 7 during cable transport and FIG. 8 illustrates the clamping/retracting unit 7 during cable retraction.

The clamping/retracting unit 7 consists of a housing 17 for guiding the cable 9 and a retracting element 18, which is arranged in the housing for the cable retraction, and a clamping element 19, which is arranged in the housing 17, for the fixing of the cable 9. The cable 9 is guided in a cable channel of the housing 17 and runs through the clamping element 19 and the retracting element 18.

The clamping element 19 is constructed as follows: a setting screw 22, which acts on a compression spring 23 arranged in a bore 21 of the housing 17, is arranged in the bore 21. The compression spring 23 acts on a displaceable cylinder 25 having a transverse projecting abutment 26 and a transverse bore 25.1 through which the cable 9 passes. When the abutment is placed in contact with the housing 17 as the cylinder is driven by first actuating device 10, and overcomes the force of compression spring 23, as shown in FIG. 7, the cable 9 runs freely through the bore 25.1 of the cylinder 25 which is aligned with the cable channel 20 in the housing 17. When the activating device 10 releases the cylinder 25, as shown in FIG. 8, the cylinder is driven to the left in the Figure by compression spring 23, and the cable 9 is pressed against the wall of cable channel 20 and firmly clamped. The clamping force is adjustable by means of the setting screw 22.

The retracting element 18 is constructed as follows: A setting screw 28, which acts on a compression spring 29 arranged in a bore 27 of the housing 17, is arranged in the bore 27. The compression spring 29 acts on a spaced hemispherical head 31 of a cylinder 32 having a projecting transverse abutment 33. When the abutment is placed in contact with the housing 17 by actuating device 10, as shown in FIG. 7, the cable 9 runs freely past the hemispherical head 31 of the cylinder 32. When the actuating device releases the cylinder 32, as shown in FIG. 8, the hemispherical head 31 is driven to the left by compression spring 29, engaging the cable 9 and causing a cable loop 34 to be formed in the housing 17. A deflector 35, for example a pin, arranged in the housing 17 prevents damage to the cable and facilitates formation of the loop. Due to the cable multiple length in the housing 17 the cable 9 is also clamped at the outlet side. The clamping force, dependent on the cable thickness, is adjustable by means of the setting screw 28.

The cylinder 32 further is connected to an arm 36 which is actuable by a ram 37 of the first actuating device 10, for example a pneumatic cylinder, which also actuates the cylinder 25. When the ram 37 is extended, the retracting element 18 and the clamping element 19 are in the position shown in FIG. 7, in which cable transport is possible in the cable transport direction P2. When the ram 37 is retracted in accordance with FIG. 8 the compression springs 23, 29 are determinative, whereby the cable 9 is, as explained above, clamped at the inlet side and retracted at the outlet side of the unit 7.

I claim:

1. Cable processing equipment, comprising a cable changer for holding a plurality of cables; a cable transport device for selecting one of the plurality of cables for further processing; and a clamping unit for individually clamping each cable, the clamping unit comprising a first, combined clamping/retracting device and a second clamping device located remote from the first clamping/retracting device, the first, combined clamping/retracting device having a housing having a cable guide, a retraction cylinder for engaging a cable arranged in the housing and actuable against a first spring force, a clamping cylinder for engaging a cable arranged in the housing actuable against a second spring force, and a plunger for simultaneously actuating the retraction and clamping cylinders.

2. The cable processing equipment according to claim 1, characterized in that the retraction and clamping cylinders in an actuated state permit cable transport in the cable transport direction, the clamping cylinder in a non-actuated state firmly clamps the cable in the housing and the retraction cylinder in a non-actuated state draws the cable back into the housing.

3. The cable processing equipment according to claim 1, characterized in that the clamping device comprises a housing having a cable guide and a clamping cylinder arranged in the housing and actuable against a spring force.

4. The cable processing equipment according to claim 1, wherein the clamping/retracting device is located at an inlet side of the cable changer and the clamping device is located at an outlet side of the cable changer.

* * * * *